Oct. 19, 1954

G. A. BRETTELL, JR 2,692,377

POSITION PLOTTER

Filed Jan. 16, 1946

INVENTOR.
GEORGE A. BRETTELL, JR.

BY George Sipkin

George E. Pearson

ATTORNEYS

Oct. 19, 1954

G. A. BRETTELL, JR 2,692,377

POSITION PLOTTER

Filed Jan. 16, 1946

INVENTOR.
GEORGE A. BRETTELL, JR.

BY George Sipkin
George E. Pearson
ATTORNEYS

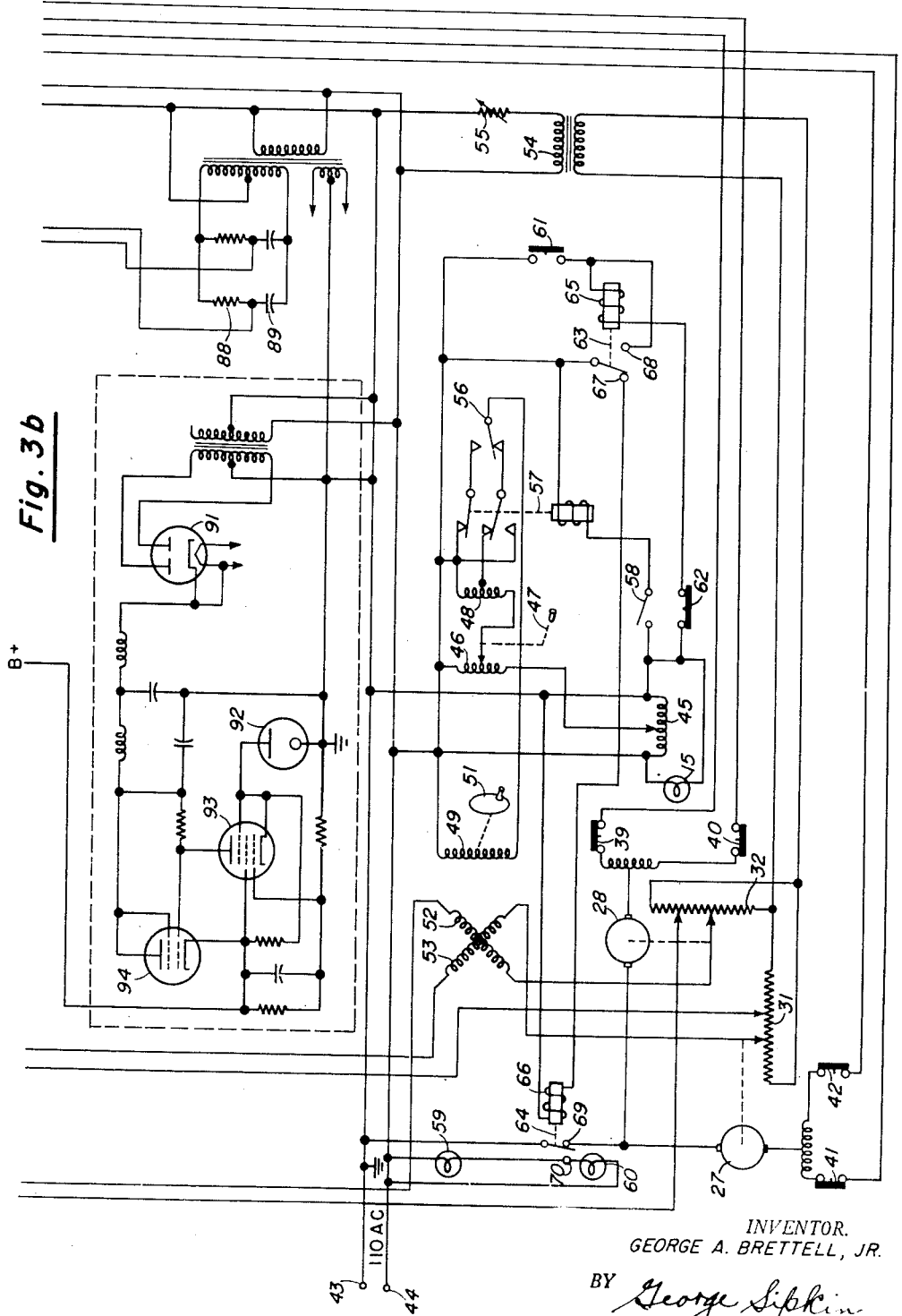

Patented Oct. 19, 1954

2,692,377

UNITED STATES PATENT OFFICE 2,692,377

POSITION PLOTTER

George A. Brettell, Jr., Newark, N. J., assignor to the United States of America as represented by the Secretary of the Navy Application January 16, 1946, Serial No. 641,607

4 Claims. (Cl. 340—24)

The present invention relates to a servo system and more particularly a plotting system for reproducing the position of objects relative to a predetermined point wherein a plotting table is provided with two electrical servo systems which may be selectively controlled by the radar operator and the plotting attendant.

A servo provides power for executing a control function in response to operations of less powerful measuring devices. For example, in the so-called automatic pilot of an airplane a sensitive and delicate gyroscope indicates deviations from level flight and a servo mechanism furnishes the power for operating the controls for bringing the plane back to level flight. Furthermore, as the ship returns to its level position the gyroscope indicates that fact and the servo returns the controls to the level position. In general a servo includes means coupled with the measuring apparatus for providing an indication of the need for control operations, a motor for performing the control function, and means operated by the motor along with the controls, for balancing out the original indication. Thus the purpose of the servo is to provide a pattern of operation corresponding to the magnitude of the deviation indicated by the primary measuring instrument.

A specific embodiment of the present invention consists of electronically controlled electric motors for operating the plotter described in the earlier U. S. patent of Firth Pierce and George A. Brettell, Jr., No. 2,566,247, dated August 28, 1951.

In the preferred embodiment of the present invention as disclosed herein, a plotting board is provided with a light source which indicates own ship's position and is driven by the conventional mechanism of the dead reckoning tracer. A second light source to indicate the position of a target is driven by a pair of servomotors which are controlled by the potential difference between two pairs of brushes mounted on the positioning mechanism for the two indicator lights and contacting linear potentiometers arranged at right angles along two edges of the plotting table. The voltage difference between the two brushes contacting each potentiometer is opposed to the quadrature components of a resolver which is controlled by the range and bearing cranks of a ranging device such as radar, or sonar. The difference voltage is filtered and amplified to drive the servomotors and thus position the target in its proper relation to own ship's position. Controls and switching means are provided for the radar operator and plotting attendant to disable the servo systems when the position of a target has been determined, and to re-able or energize the servo system when the position of the target has been marked by the plotting attendant.

One object of the present invention is to provide an improved servo system to facilitate the plotting of own ship's position and the relative position of one or more targets which are located by suitable ranging and direction finding devices such as radar and sonar.

Another object of the present invention is to provide a plotting system which facilitates the rapid communication and control thereof by the plotting attendants and the operator of the ranging and direction finding device.

Other objects and many of the attendant advantages of this invention will be readily appreciated as the same becomes better understood by reference to the following detailed description when considered in connection with the accompanying drawings wherein:

Figs. 3a and 3b constitute a detailed electrical schematic diagram of the servo system and controls of Fig. 2 and the switching arrangement by which the radar and plotting operators control the system.

Figure 1:
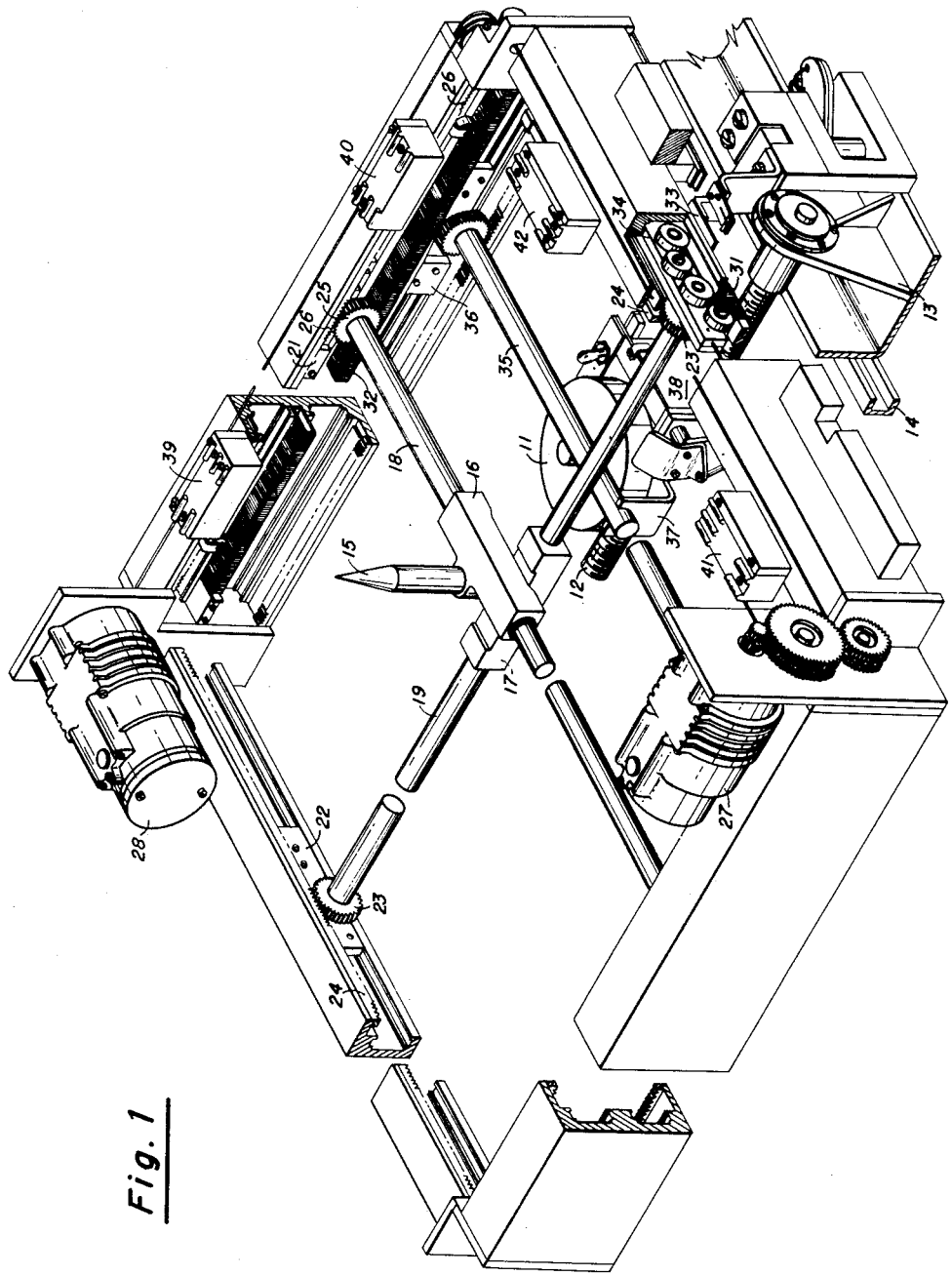
Fig. 1 is a perspective view, partly broken away, showing the plotting device of the prior application, and parts of the servo apparatus.

The plotter of Fig. 1 is used with a dead-reckoning tracer (DRT) which is housed in a glass covered rectangular box, not shown. A sheet of plotting paper is intended to be laid over the glass top so that ship movements indicated by lights from below can be plotted thereon. In Fig. 1 a light source which includes the reflector 11 projects a small spot of light up onto the plotting paper for indicating the location of own ship. This light source is carried on a lead screw 12 which is mounted on end brackets 13 which in turn travel on rails 14. The movements along the rail 14 produce, for example, east and west components of own ship's movement and movement along the lead screw 12 depicts north south components of the motion. The manner of controlling reflector 11 for thus depicting own ship's movement is no part of the present invention. The plotter, which is attached to the DRT, includes a light source 15 carried by a pair of blocks 16 and 17 which in turn are carried on rods 18 and 19 which lie at right angles to each other and are carried by carts 21 and 22. Rod 19 carries gears 23 which mesh with racks 24 to insure that the two ends of the rod move the same distance. Similarly rod 18 has gears 25 meshing with racks 26.

The purpose of this plotter is to employ the light source 15 for indicating on the plotting paper the location of other objects such as target ships. Data as to such locations are generally obtained in terms of bearing and range, that is, compass direction and distance as measured from own-ship. In the present invention these bearing and range data are converted automatically into north and east components of distance, and the light 15 which represents the target object is then automatically moved by motors 27 and 28 to the proper position relative to the light 11, which represents the location of own ship, so that the target location may be marked by the plotting attendant. To this end potentiometers 31 and 32 are provided. Each of these consists of a wire wound bar extending along one full dimension of the plotting table. The bracket 13 which moves in accordance with the east-west motions of own ship carries electric contacts 33 which ride against potentiometer 31 and the carriage 34 for the rod 19 (which moves in accordance with east-west motions of the target object) carries a similar contact (not shown) which also bears against the potentiometer 31. When own ship and target have the same east-west coordinate their respective electric contacts pick up the same voltage from the potentiometer 31. Thus the voltage that appears between these two sets of contacts is a measure of the east-west component of the distance from own ship as indicated by light 11 and the target as indicated by light 13. A rod 35 supported in carriages 36 is engaged by a U-shaped arm 37 supported on block 38 so that it follows the north-south motions of own-ship. The carriage 36 and also the carriage 21 of rod 18 carry electric contacts which bear against the potentiometer 32 so that the voltage appearing between those contacts is a measure of the north-south separation between the lights 11 and 15. A pair of switches 39 and 40 controlling motor 28 are actuated by rod 18 at the extremes of its travel to prevent the motor from pulling against the end stops. Similar limit switches 41 and 42 are also provided for motor 27.

Figure 2:
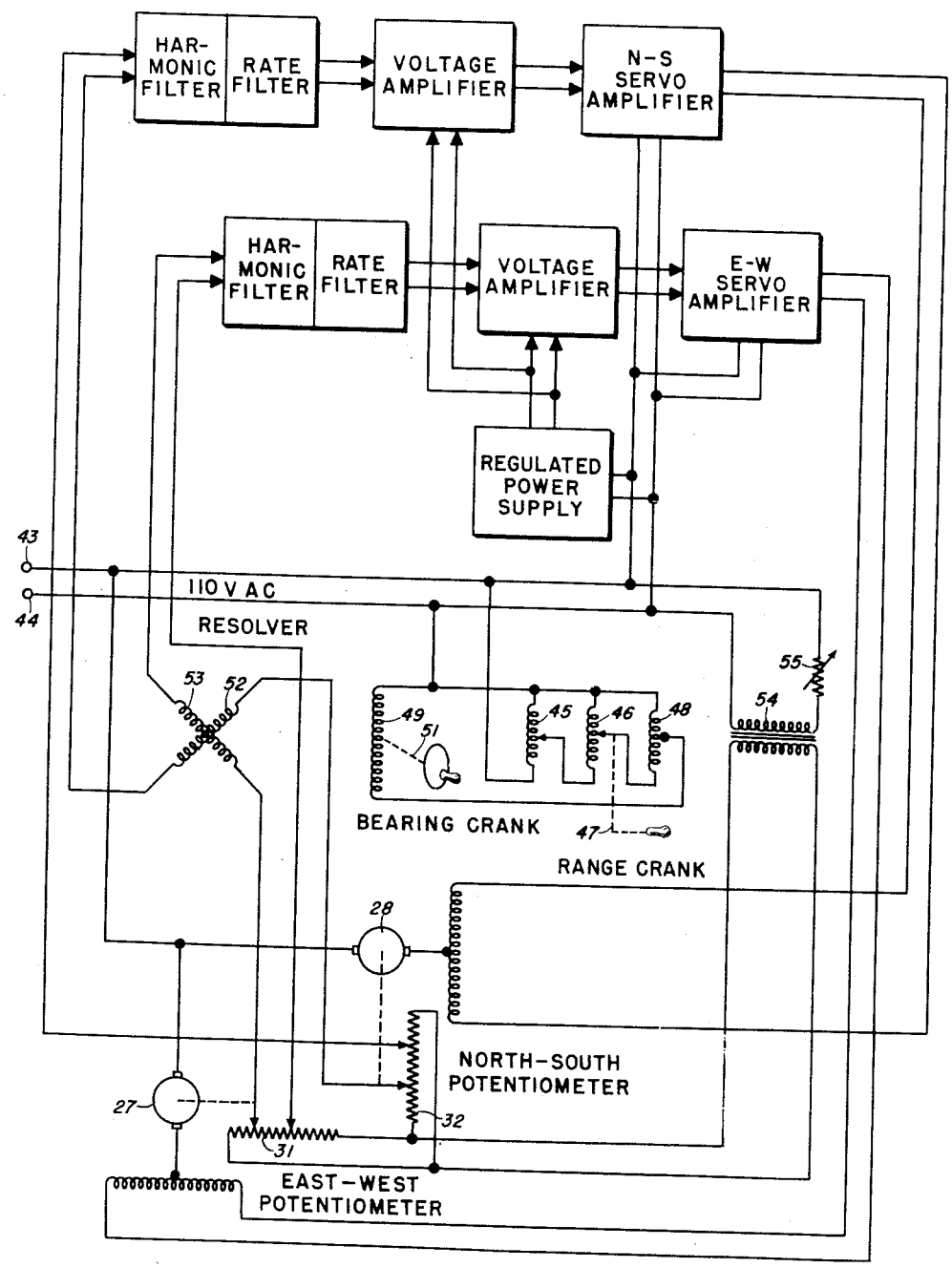
Fig. 2 is a simplified electrical schematic in block diagram of the servo system and certain controls therefor.

As shown in Figs. 2 and 3, A. C. power is applied at terminals 43 and 44. This energizes a calibrated variac 45 which is located at the DRT table, which in turn energizes a second calibrated variac 46 located at the transmitter station and actuated by the radar range crank 47. Energized from this variac 46 is a tapped auto-transformer 48, the output connections of which are connected to the rotor winding 49 of a resolver which is rotated by the radar bearing crank 51. The resolver also has a stator with quadrature windings 52 and 53 which deliver north-south and east-west voltage components respectively.

A transformer 54 has its primary supplied from the same power input terminals 43 and 44 through an adjustable resistor 55. The output of transformer 54 energizes the two potentiometers 31 and 32 of Fig. 1.

The simplified circuitry for actuating the servomotors 27 and 28 is illustrated in Fig. 2 wherein the difference voltages between the windings 52 and 53 and the potentiometers 31 and 32 are applied through the harmonic filters and rate filters to the voltage amplifiers and servo amplifiers indicated in block diagram form. The output of the servo amplifiers is applied to one of the field windings of the servomotors to drive the indicating light in the proper direction to indicate the target position.

Variac 46 is the range transmitting potentiometer. For example, the source of range and bearing information may be a radar unit, in which case, potentiometer 46 is mechanically coupled to the range control crank 47 of the radar so that when the radar operator sets his range-dial he automatically sets the range indication for the servo circuits. Range multiplier switch 56 (shown in Fig. 3b) is also located at the transmitter station. It is used by the radar operator when he changes his own range scale. He has two scales which differ from each other by a ratio of 5 to 1. Thus on his short-range scale a certain adjustment of his range control and therefore of variac 46 will indicate 5000 yards. In that case switch 56 should be in its lower position as seen in Fig. 3b. On his long-range scale the same setting of his variac 46 would indicate 25,000 yards and in that case switch 56 would be in its upper position to provide five times as much voltage. Thus, except for the operation of variac 45 and relay 57 which will be explained presently, range transmitting variac 46 and switch 56 deliver a voltage to coil 49 of the resolver which is strictly proportional to the range of the target.

Coil 49 is rotated by the bearing control of the radar control station so that the outputs of coils 52 and 53 bear relations to the voltage of coil 49 which are sine and cosine functions of the bearing angle of the target, that is the number of degrees to the right of north at which the target lies. Accordingly, the output voltages from coils 52 and 53 are proportional to the north-south and east-west distance components from the radar observer (located at own ship) to the target. Accordingly, if the voltages appearing across the pairs of contacts at potentiometers 31 and 32 are made equal to the output voltages of coils 53 and 52, the lamp 15 of Fig. 1 will be at the proper position to indicate the location of the target on the plotting paper (as was described in connection with Fig. 1).

The task of the servo system is to drive the rods 18 and 19 which carry the lamp 15 to the positions that make these voltages equal. For example, the output of the two contacts at the E-W potentiometer 31 is connected in series with that from the coil 53 so that they subtract, and the servo system drives the E-W motor 27 to bring this difference-voltage to zero.

The voltage impressed across the potentiometers 31 and 32 is kept at maximum so that the degree of accuracy as measured in inches on the plot will be kept at maximum. To increase the scale of the plot, that is to increase the number of inches on the map that represent a thousand yards of distance, the voltage is raised at variac 45, which is located at the DRT table. The scale may be multiplied by a factor of 5 (so that 1 inch of the plot represents ⅕ as many yards) by energizing relay 57 to take the power from the higher voltage tap of transformer 48. As may be seen from the circuit connections, relay 57 is effective to thus increase the plotting scale only when the radar operator is using his short range scale, that is when he has switch 56 in the lower position as seen in Fig. 3b. Relay 57 is located at the transmitting station, near the radar apparatus but is controlled by contacts 58 at the DRT table, as may be seen from the circuit Fig. 3b.

The resolver has a construction like that of a polyphase induction motor which places an air gap in its magnetic circuit. One effect of this air gap is to increase the magnetizing current and thereby present an appreciable inductance to the input circuit so that the output voltage (from coils 52 and 53) leads that applied to primary coil 49. The high accuracy and sensitivity required of the present system makes it necessary that the voltages from each potentiometer 31 and 32 be in phase with that from the coil 53 or 52 with which it is connected because two out-of-phase voltages can never exactly cancel each other. Accordingly, transformer 54 is constructed with an air gap in its magnetic circuit, and rheostat 55 permits the series resistance to be adjusted to make the ratio of resistance to inductance the same for the primary circuits of the resolver and transformer 54. In practice, this adjustment is made by observing the relative phases of the output voltage. Since this construction gives the input circuits of the resolver and transformer 54 essentially the same character, the system stays in balance in spite of changes in the frequency of the supply voltage.

The servo system of the present invention operates at extremely high speed and so is capable of moving the target light 15 quickly from one position of the plot to another. This high speed coupled with the high accuracy of its operation is an extremely valuable property. So before explaining the servo system itself it is convenient to describe first, some other features of the invention which permit this high speed to be taken full advantage of. First it should be borne in mind that a single radar control unit can be operated rapidly enough to track several targets by taking repeated bearings and ranges on them. The operator rotates his equipment to the bearing at which he gets a good target indication and then turns his range knob to line up certain indicators for getting an accurate range measurement. As was described in connection with Fig. 2, these two operations bring the voltages at coils 52 and 53 to values which indicate the north-south and east-west components of the target's distance from own ship. Furthermore since the servo operates at high speed the light 15 arrives at the correct position in a fraction of a second. When the radar operator has these settings he signals the plotting attendant to mark. He does so by pressing a mark switch 61 which turns on signal lights 59 at the radar station and 60 at the DRT table and also disables the servo motors 27 and 28. Thereupon the target light 15 is left stationary to "remember" the target position so that the radar operator is released to search out the next target without waiting for the plotting attendant to complete his task. After he has marked the location of the target, the plotting attendant presses a release button 62 which immediately restores the servo operation and, because the servo operates at high speed, the light 15 jumps to the new position. This operation of the servo is as fast as a person's reaction time so that the radar operator, if he has been waiting for the plotting attendant to release the equipment, can press the "mark" switch again as soon as he sees the "release" signal.

Two relays 63 and 64 having coils 65 and 66, perform the functions and provide the signals by which the radar operator and marking attendant control the servo operation as already described.

The coil 66 of relay 64 is energized through normally-closed contact 67 of relay 63. The radar operator's "mark" switch 61, when pressed, energizes the coil 65 of relay 63 which thereupon locks itself in through its normally-open contact 68. Relay 63 also opens its contact 67 to de-energize the coil 66 of relay 64. Upon dropping out, relay 64 opens its contact 69 which controls the power to the servomotors 27 and 28 to thereby disable the servo system while relay 63 is energized. Relay 64, being thus de-energized, also closes its contacts 70 to turn on the "mark" lamp 60 at the DRT table and also a "plotting" lamp 59 at the radar control station.

The plotting attendant actuates a normally closed switch or release button 62 which when open releases relay 63 and closes the contact 67 to re-energize the coil 66 of relay 64. Relay 64 then closes its contacts 69 to re-able the servo and also opens its contact 70 to extinguish the lamps 59 and 60.

Figure 3A:
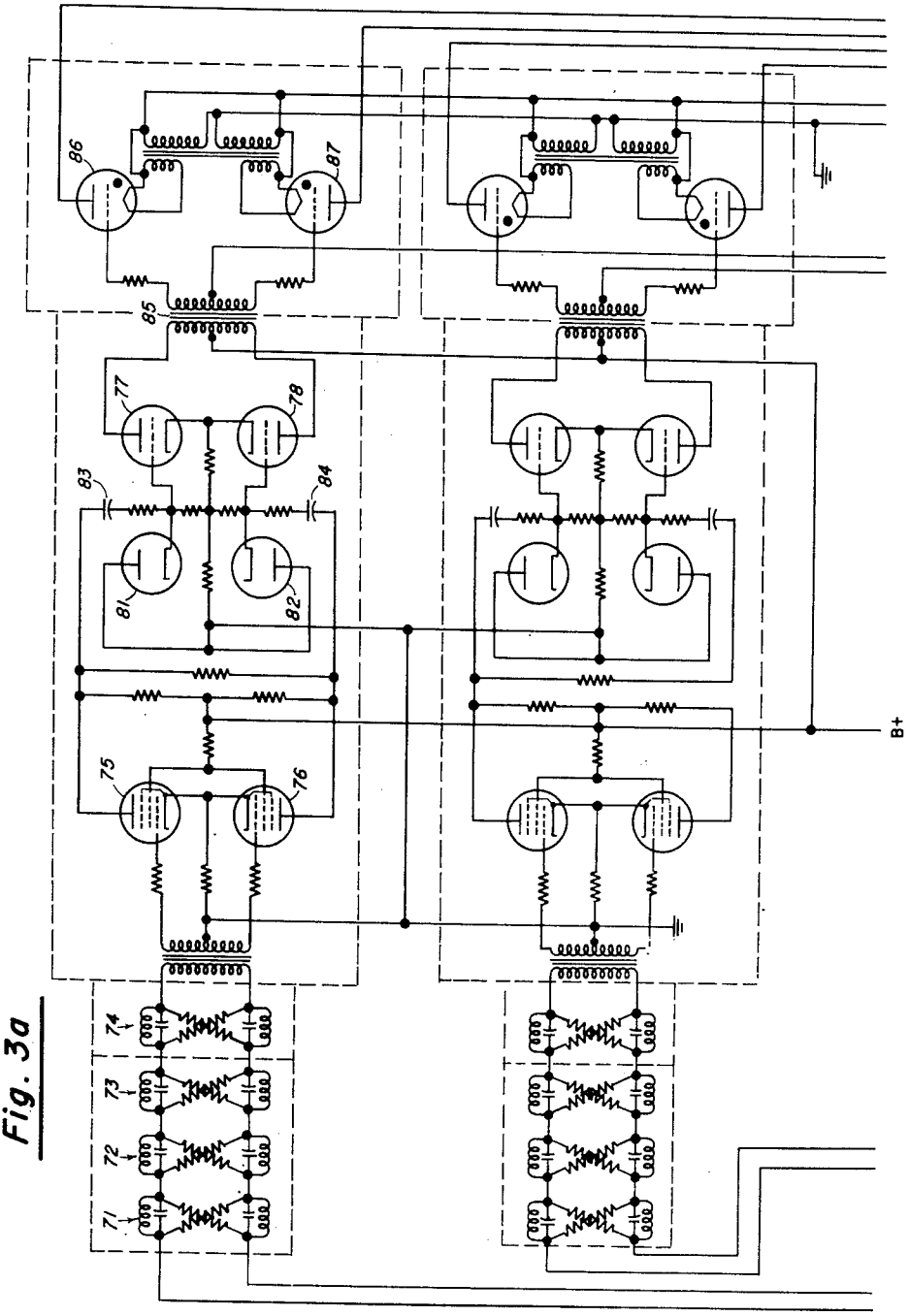

The servo amplifier circuits are shown in detail in Fig. 3a. Since both amplifier circuits are identical, only the operation of the amplifier controlling the north-south servomotor 28 will be described in detail. It is to be expected that a system of transformers such as that shown in Figs. 2 and 3b would have an output voltage containing a number of harmonics of the fundamental 60 cycle voltage. These are troublesome and the input circuit is provided with filters 71, 72 and 73 for eliminating the third, fifth and seventh harmonics. Higher order harmonics appear with such small amplitudes as to be unobjectionable. Because of the symmetrical character of the system even harmonics will not appear. These filters 71, 72 and 73 are constructed with high Q, and also with careful adjustment, to provide substantially complete elimination of a narrow band of frequencies centered at 180, 300 and 420 respectively.

Filter 74 is of a somewhat different construction and contributes to the high-speed operation of the system. It passes a substantial part of the 60 cycle input signal and increases its transmission for both higher and lower frequencies. This frequency characteristic of the filter makes the output of the amplifier vary as the algebraic sum of two voltages, one proportional to the instantaneous magnitude of the 60 cycle input and the other proportional to the rate at which that magnitude is changing. In terms of operation of the servomotor 28, the amplifier output has two components. One is proportional to the number of volts, as measured on potentiometer 32, by which the rod 18 fails to lie in its correct position. The other component is proportional to the speed at which rod 18 approaches the correct position. This speed component prevents over-shoot. For example when the plotting attendant opens his switch 62 to re-able the circuits to the servomotors, the rod 18 may be a considerable distance from its proper position. Motor 28 will receive a component of current proportional to this distance (limited of course by the maximum current available from the control tubes) and will move at high speed toward the correct position. If no account were taken of this speed, the inertia of the system would make it run beyond the proper point because when the driving voltage went to zero the motor 28 would still be spinning. However, in the present system an opposing voltage proportional to speed is introduced, which provides a drive in the reverse direction at the time that the rod 18 is approaching its correct position so as to slow down the motor. When the system is properly adjusted, overshoot is held to approximately 1/32 of an inch. This slight over-shoot makes the light 15 settle down with a slight shake which tends to equalize any unavoidable blacklash that is present in the system.

Viewed differently, the error voltage from potentiometer 32 and winding 52, if amplified linearly to control the servomotor 28, would provide a driving force proportional to the displacement. Such a driving force by itself would produce sustained oscillations. That is, the light 15 would oscillate about the target position instead of coming to rest there. It is known that an additional force proportional to velocity in a sufficiently high ratio and opposing the motion (usually called a damping force) will prevent such oscillations. It is also known that if the error voltage is A. C., a voltage proportional to the velocity (that is to the rate of change of the error voltage) will consist of a certain pattern of side-band frequencies, and that substantially the desired pattern can be obtained by passing the error signal itself through a suitable filter, such as filter 74.

Filters which provide an approximation of the ideal transmission characteristics for this purpose are known in the art, however, an improved filter which passes the side band frequencies to the proper extent and provides a much closer approximation of ideal characteristics is preferred and is disclosed in the copending divisional application to George A. Brettell for Electric Servo Systems, Serial No. 407,621, filed January 29, 1954, wherein the mathematical theory and design criterion are set forth in detail.

The output of filter 74 is applied to a pair of push-pull amplifiers 75 and 76. The input signal at times may be beyond the capacity of these amplifiers, and under these conditions the output will be essentially a square wave. This output is applied to a second pair of push-pull stages 77 and 78. Connected in parallel with the grid circuits of the stages 77 and 78 is a pair of diodes 81 and 82 so balanced that when the input voltage is high enough to make the grid of the tube 77 or 78 swing positive to draw current, the opposite swing of the voltage will cause the diodes to draw an equal but opposite current and thereby prevent a charge from accumulating on the coupling condensers 83 and 84. This arrangement prevents the amplifiers 77 and 78 from imposing phase distortion on the signal under overload. This voltage amplifier circuit which suppresses phase distortion is disclosed and claimed in the co-pending divisional application of George A. Brettell, Jr., Serial No. 407,620, filed 29 January 1954. The output of amplifiers 77 and 78 is applied through coupling transformer 85 to a pair of thyratrons 86 and 87. The plate voltage for these thyratrons is 60 cycles A. C. since these thyratrons are connected directly in series with the 60 cycle servomotor 28. An A. C. bias voltage is supplied from a bias phase adjuster network which includes the resistor 88 and condenser 89 such that the bias voltage leads the cathode voltage of the tube by a phase angle of approximately 60 degrees. Since phase distortion has been kept out of the amplifier, the signal which transformer 85 adds to this bias has substantially either the same phase as the anode voltage or the opposite phase (except for the phase advance caused by the resolver). Thus one tube increases its current and the other decreases it to control the motor.

Each of the servomotors 27 and 28 has two opposing field windings. Thus each of the thyratrons 86 and 87 controls the current to one of the windings of the N-S servomotor 28. Normally the two windings receive equal currents so that the motor does not turn. Any signal applied to the thyratrons through transformer 85 disturbs this balance and drives the motor in the proper direction.

Any suitable regulated power supply may be provided, but one preferred circuit including rectifier tube 91, voltage regulator tube 92, and tubes 93 and 94 is illustrated for supplying a B+ voltage to the voltage amplifiers.

Obviously many modifications and variations of the present invention are possible in the light of the above teachings. It is therefore to be understood that within the scope of the appended claims the invention may be practiced otherwise than as specifically described.

What is claimed is:

1. In a plotting system for reproducing the position of objects relative to a predetermined point, means adapted to be connected to the range control of a ranging device for producing a range voltage varying in amplitude with the range to an object from said ranging device, means adapted to be connected to the direction control of said ranging device for resolving said range voltage into component voltages varying with the sine and cosine respectively of the direction angle indicated by said ranging device, a plotting table comprising two electrical servo-systems respectively responsive to said sine and cosine component voltages, indicator means mechanically connected to both of said servo-systems for independent movement thereby in respective perpendicular directions, switching means for energizing and deenergizing said servo-systems, first control means associated with said switching means and manually operable from a position adjacent said ranging device for deenergizing said servo-systems when the position of an object relative to said ranging device has been determined, and second control means associated with said switching means and manually operable from a position adjacent said plotting table for energizing said servo-systems when the position of the object has been marked by the operator.

2. The system as set forth in claim 1 including separate signal means adjacent said ranging device and said plotting table respectively, and wherein said first control means also actuates said signal means at said plotting table when said servo-systems are deenergized, and said second control means also actuates said signal means at the ranging device when said servo-systems are energized.

3. In a plotting system for reproducing the position of a remote object relative to a predetermined point, means adapted to be connected to a ranging and direction finding device for producing a signal varying with the position of said remote object, a plotting table including a servo-system responsive to said signal and indicator means movable by said servo-system to indicate on the table a position corresponding to the position of said remote object, switching means for energizing and deenergizing said servo-system, first control means associated with said switching means and manually operable from a position adjacent said ranging device for deenergizing said servo-system when the position of an object relative to said device has been determined, and second control means associated with said switching means and manually operable from a position adjacent said plotting table for energizing said servo-system when the position of the object has been marked by the operator.

4. The system as set forth in claim 3 including separate signal means adjacent said device and said plotting table respectively, and wherein said first control means also actuates said signal means at said plotting table when said servo-system is deenergized, and said second control means also actuates said signal means at said device when said servo-system is energized.

References Cited in the file of this patent

UNITED STATES PATENTS

| Number | Name | Date |
|---|---|---|
| 1,077,818 | Eagar | Nov. 4, 1913 |
| 1,426,334 | Pernot et al. | Aug. 15, 1922 |
| 1,957,240 | Young | May 1, 1934 |
| 2,088,654 | Hull | Aug. 3, 1937 |
| 2,191,730 | Sjostrand | Feb. 27, 1940 |
| 2,231,374 | Stillwell | Feb. 11, 1941 |
| 2,233,415 | Hull | Mar. 4, 1941 |
| 2,280,282 | Colchester et al. | Apr. 21, 1942 |
| 2,290,553 | Haantjes | July 21, 1942 |
| 2,339,750 | Bartholy | Jan. 25, 1944 |
| 2,360,361 | Mountbatten | Oct. 17, 1944 |
| 2,485,663 | Rusch | Oct. 25, 1949 |

FOREIGN PATENTS

| Number | Country | Date |
|---|---|---|
| 14,379 | Great Britain | Oct. 11, 1915 |